Aug. 7, 1951 E. M. SPLAINE 2,563,429
CONNECTING MEANS FOR USE IN OPHTHALMIC MOUNTINGS
Filed Dec. 18, 1947
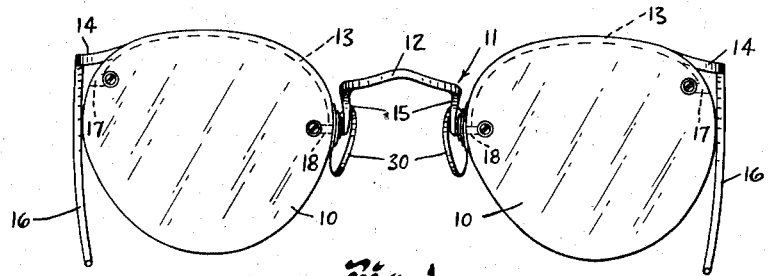
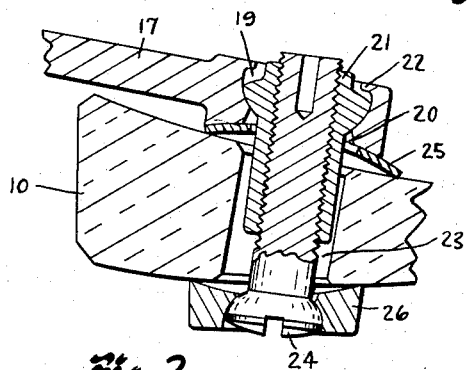
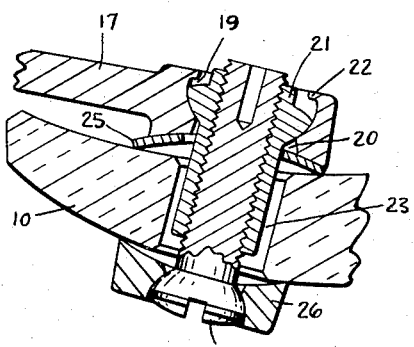
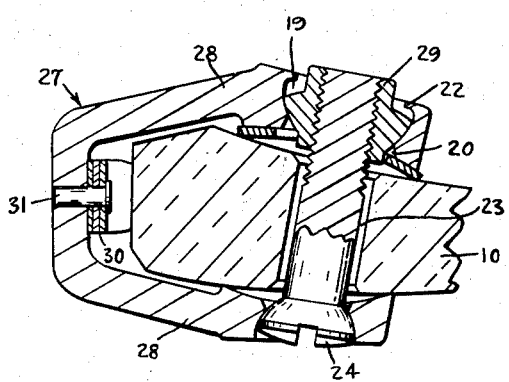
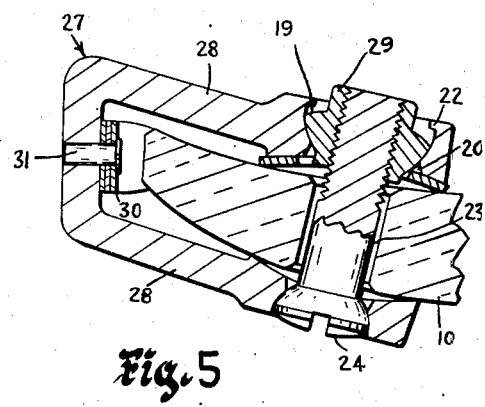
INVENTOR.
EDWARD M. SPLAINE
BY
ATTORNEY.

Patented Aug. 7, 1951

2,563,429

UNITED STATES PATENT OFFICE 2,563,429

CONNECTING MEANS FOR USE IN OPHTHALMIC MOUNTINGS

Edward M. Splaine, Southbridge, Mass., assignor to American Optical Company, Southbridge, Mass., a voluntary association of Massachusetts Application December 18, 1947, Serial No. 792,426

8 Claims. (Cl. 88—42)

This invention relates to connecting means for uniting parts of ophthalmic mountings and has particular reference to improved rimless lens straps having self-aligning means for connecting the lenses to their supporting structures.

In the past it has been very difficult to provide a single type rimless lens strap adaptable for connecting variously shaped lenses to their supporting structures without imposing some strain on the lenses due to the fact that the adjustment of such individual strap means to the contour of all lenses which it is to support while retaining the connection opening or openings thereof in proper alignment with the opening in the lens to receive the attachment screw or other known connection means, is practically impossible to make. This difficulty made it necessary to either provide an individual type of lens strap for each shape of lens or to attempt to shape the strap to each individual lens shape, thus requiring the manufacture and stocking of many various forms and sizes of straps or the extra labor involved at assembly in generally unsuccessfully fashioning a single form of strap to fit the variety of lens shapes.

With the present invention, there is provided lens straps adaptable to any lens shape without the necessity of special difficult handling or fitting operations as the portions to receive the attachment screw or other known connection means are of a self-adjusting and readily alignable nature.

Therefore, it is an important object of this invention to provide new and improved straps for connecting the lenses of ophthalmic mountings to their supporting structures, such straps being universally adaptable to variously shaped lenses, and being entirely self-aligning to receive the attachment screws or other commercially known connection means.

Another object is the provision of new and improved means for more quickly, more easily, and more efficiently uniting the lenses of ophthalmic mountings to their supporting structures.

Another object is the provision of improved means for connecting the lenses of ophthalmic mountings to their supporting structures wherein assembly of the parts will cause said parts to attain a self-aligned relationship without imposing stress in any small area on the surface of the lens.

Further objects of the invention are to provide, in a manner as hereinafter set forth, new and improved means for connecting the parts of ophthalmic mountings which is simple in construction and arrangement, strong, durable, thoroughly efficient in use, readily assembled, and comparatively economical to manufacture.

Other objects and advantages of the invention will become apparent from the following description taken in connection with the accompanying drawing in which:

Fig. 1 is a front elevation of an ophthalmic mounting embodying the invention;

Fig. 2 is a sectional view of the lens connecting means showing the single ear connection as applied to a plus lens;

Fig. 3 is a sectional view similar to Fig. 2 showing the invention as applied to a minus lens;

Fig. 4 is a sectional view of the lens connecting means showing the double ear connection as applied to a plus lens; and Fig. 5 is a sectional view similar to Fig. 4 showing the invention as applied to a minus lens.

Referring more particularly to the drawing wherein like characters of reference designate like parts throughout the several views, the device embodying the invention as illustrated in Fig. 1 comprises broadly a pair of lenses 10 carried by a supporting structure or frame 11. The supporting structure 11 comprises a main bridge member 12 having integral transverse lens supporting arms 13 shaped substantially to follow the adjacent upper contour edge portions of the lenses 10 and having temple supporting end portions 14 extending slightly outwardly and rearwardly of the lenses at their temporal regions. The main bridge member 12 also has depending arms 15 projecting downwardly adjacent the nasal contour edge portions of the lenses 10.

The temple supporting end portions 14 have suitable temples or sides 16 attached thereto, the portions 14 extending outwardly and rearwardly of the temporal ends of the transverse lens supporting arms 13 at a location substantially out of the useful field of vision when the mounting is in position of use, with the temples 16 being located so as to project rearwardly from this position.

The temporal and nasal lens connections each consist primarily of a strap member suitably connected to the supporting structure, the temporal lens strap being designated in Fig. 1 by numeral 17 and being attached to the transverse arm 13 of the supporting structure 11 adjacent the temporal regions of the lenses 10 by solder, rivets, screws, or any other suitable means. The nasal straps, designated in Fig. 1 by the numeral 18, are suitably connected preferably by solder or similar means to the lower ends of the depending arms 15 and are adapted to project outwardly toward the lenses 10 and to be connected to the lenses in the nasal regions thereof.

The strap members 17 and 18 are of a generally flat elongated shape and are preferably made of a pliable material having considerable strength. In the present construction, the strap members are each attached to the supporting structure as above described, each strap being adapted to project towards and in abutting relation with the rear surface of its respective lens 10.

The single ear type of lens strap 17 or 18 has its free end enlarged and is substantially flattened, the end being provided with a semi-spherical shaped recess or socket 19 therein which communicates with a downwardly diverging conically shaped opening 20. The surface of the strap adjacent the member to be supported, in this instance the lens 10, has a general concave shape to provide a bearing pressure on said lens, in assembling the device at a location spaced outwardly of the contour of the opening in the lens thereby diminishing the possibility of breakage due to excessive pressure being applied adjacent said opening.

A tubular connecting member 21 is adapted to be inserted into the recess or socket 19 in the lens strap 17 and to project freely through the conical opening 20, the member 21 having an enlarged end portion formed with a ball shaped undersurface to conform with the shape of the recess 19, thereby assuming a substantial ball and socket relationship with said recess. The recess 19 has formed on the outer peripheral edge thereof a flange 22, said flange being of such dimensions as to be turned or spun inwardly to project over the ball portion of the connecting member 21 which is located in the recess 19 and thereby serving to retain the member within the recess. It is to be noted that the flange 22 may border the entire periphery of the recess 19 or may border portions only of the recess. The conical opening 20 provides clearance for the angling of the tubular connecting member 21.

Fig. 2 discloses a lens 10 of a minus power wherein the lens has the characteristics of having its outer contour edge portions thicker than its interior or central portions, the opposite being disclosed by Fig. 3 wherein a plus lens is shown as having its central portion thicker than its contour edge portions. Either lens may be efficiently supported by the present connecting means without requiring any redesigning or reshaping of the means to fit and properly support the lens.

The lens 10 is provided with a transverse bore 23 into one end of which the tubular connecting member 21 is adapted to project and is of a diameter sufficient to permit free lateral swinging movement of said connecting member. A headed connecting member 24 is adapted to project into the bore 23 of the lens 10 from the opposite direction and to be inserted within the tubular connecting member 21 and securely held therein by suitable means such as threads or by soldering, etc.

A concavely shaped washer member 25 is adapted to be loosely fitted over the tubular connecting member 21 and to be located in self-aligned relationship between the lens strap 17 and the lens 10, the washer being shaped to conform to the shape of the concave surface of the strap 17 and to slidably reside thereagainst. A second washer member 26 is adapted to be located over the headed connecting member 24 between said member and the lens 10 and has a concave surface formed thereon in abutment with the lens 10 to distribute pressure on the lens in a manner similar to the concave surface of the strap 17. The washer member 26 also has a recess and conical opening similar to the recess and opening in the strap 17 with the head of the connecting member 24 being shaped in conformity with the recess to provide a second ball and socket joint. Thus, the connecting member 24 may be freely tilted with respect to the washer member 26. Therefore, in assembling this connection, the headed connecting member 24 will be inserted into the tubular connecting member and upon being tightened the washer member 25 will slidably move to attain a proper seating upon the surface of the lens, and the connecting members 21 and 24 will, by means of the ball joint relationship with their associated parts, become properly aligned irrespective of any variations in the opposite surfaces of the lens being supported.

By comparison between Figs. 2 and 3, it will be seen here that a lens of a plus nature, that is, a lens having thinner marginal portions and thicker interior portions may be easily connected to a lens strap by the same connecting means as is used for a minus lens having thick marginal portions and a thin interior portion, with the parts thereof assuming a self-aligned relationship to unite the lens to the strap in a very efficient and satisfactory manner and with substantially uniform pressure throughout the engaging portions.

Although Figs. 1, 2, and 3 disclose lens straps of the single ear type, it is conceivable that in many types of ophthalmic mountings, straps of the double ear type may be utilized. With reference to Figs. 4 and 5, double ear straps are shown embodying the present invention as applied to minus and plus lenses respectively. The double lens strap 27 is of a general U shape having a base portion and spaced bifurcations or ears 28, the base portion of each U-shaped strap 27 being fixedly connected by solder or the like to the end of its respective depending nasal arm 15 forming a part of the bridge member 12 or to any desirable supporting part of the mounting.

The spaced ears 28 are adapted to project upon opposite sides of the lens 10 with one of said ears being shaped similar to the single ear lens strap 17 described above, having a recess or socket 19 and communicating conical opening 20 therein and adapted to receive a tubular or perforated connecting member 29. The opposed ear in the double ear strap has its end portion shaped with a concave bearing surface, similar to the washer member 26 in the single ear connection, and has a semi-spherically shaped recess therein adapted to receive the similarly shaped head portion of the connecting member 24, the inner region of the ear also having a conically shaped opening for projection of the member 24 therethrough. Shown in Figs. 4 and 5 are small superimposed leaf springs 30 secured to the base of the strap 27 between the inner surface of said base portion and the adjacent edge of the lens 10. The springs 30 are connected to the strap by means such as a pin 31, the spring device 30 serving to assist in maintaining the lens in proper relation with its associated parts.

In Fig. 1 are nose pads 30 which are swivelly mounted on guard arms carried by the ends of the depending arms 15 of the bridge member 12 in position for proper support of the mounting upon the face of a wearer.

It is to be especially noted here that, as shown in Figs. 4 and 5, the tubular connecting member 29 is not necessarily of such length as to project into the opening 23 in the lens 10 as shown by connecting member 21 in Figs. 2 and 3. It is preferable, however, at least in the single ear construction to have the member 21 extend into the lens opening 23 since by doing so the member 21 having a substantially smooth outer surface will act as a bushing without having threads or other rough surfaces in possible engagement with the sides of the opening 23. Also, although desirable, it is not absolutely necessary to provide the self-aligning washer 25, shown in Figs. 2 and 3, since in many cases the lens strap 17 can be adjusted to approximately fit the surface of the lens 10 in a satisfactory manner.

It will be apparent that other changes may be made in the details of construction and arrangements of parts shown and described without departing from the spirit of the invention as expressed in the accompanying claims. Therefore, it is to be understood that all matter set forth or shown in the accompanying drawing is to be interpreted as illustrative and not in a limiting sense.

I claim:

1. Connecting means for uniting the supporting structure of an opthalmic mounting to an apertured lens comprising a pair of supporting members each having a concavely curved recess with an opening in the lower regions thereof alignable with the aperture in said lens on its opposed sides, and a pair of connecting members each having one end shaped to conform to the recess of a respective supporting member and to be rotatable therein, said connecting members each having a portion projecting through the opening in the recess of said supporting members and adapted to be connected with each other, said supporting members having a flange formed on the outer peripheral edge of the recess therein for permanent retention of said connecting members, and a convexly shaped self-aligning washer member adapted to be disposed between the lens to be supported and at least one of the supporting members.

2. Connecting means for uniting the supporting structure of an ophthalmic mounting to an apertured lens comprising a pair of members each having a concavely curved recess on the outer exposed side thereof with an opening in the lower regions thereof alignable with the aperture in said lens on its opposed sides, and a pair of connecting members each having one end shaped to conform to the recess of a respective recessed member and to be rotatable therein, said connecting members each having a portion to be projected through the opening in the recess of said members and adapted to be connected with each other, and a convexly shaped self-aligning washer member adapted to be disposed between the lens to be supported and at least one of the recessed members.

3. Connecting means for uniting the supporting structure of an ophthalmic mounting to an apertured lens comprising a pair of members each having a concavely spherical recess with a communicating opening in the lower regions thereof alignable with the aperture in said lens on its opposed sides, and a pair of connecting members each having one end shaped to conform to the recess of a respective recessed member and to be rotatable therein, said connecting members each having a portion projecting through the opening in the recess of said members and adapted to be connected with each other, said recessed members having a flange formed on the outer peripheral edge of the recess therein for permanent retention of said connecting members, and with at least one of said recessed members being secured to the supporting structure of the mounting.

4. Connecting means for uniting the supporting structure of an ophthalmic mounting with an apertured lens comprising a lens strap member secured adjacent one end to the supporting structure and having a concavely shaped face portion to engage the adjacent surface of the lens about the aperture thereof, and a washer member to be positioned on the opposed surface of the lens, said washer member having a concavely shaped face portion to engage the adjacent surface of the lens, said washer member and lens strap member each having a concavely curved recessed portion on the outer side thereof and a centrally disposed opening therein communicating with the concavely shaped lens surface engaging face thereof, a head portion rotatably seated in each of the recessed portions of said washer member and lens strap member, and connection means extendable through the openings in said members and the aperture of the lens when aligned therewith to join said rotatable head portions in connected relation.

5. Connecting means for uniting the supporting structure of an ophthalmic mounting with an apertured lens comprising a lens strap member secured adjacent one end to the supporting structure and having a face portion to engage the adjacent surface of the lens about the aperture thereof, and a member freely movable with respect to the supporting structure to be positioned on the opposed surface of the lens, said freely movable member and lens strap member each having a concavely curved recessed portion on the outer side thereof and a centrally disposed opening therein of conical shape, together with convexly shaped washer means to be disposed between at least one of said recessed members and the lens, a head portion rotatably seated in each of the recessed portions of said freely movably member and lens strap member, and connection means extendable through the openings in said members and the aperture of the lens when aligned therewith to joint said rotatable head portions in connected relation.

6. Connecting means for uniting the supporting structure of an ophthalmic mounting with an apertured lens comprising a lens strap member secured adjacent one end to the supporting structure and having a face portion to engage the adjacent surface of the lens about the aperture thereof, and a washer member to be positioned on the opposed surface of the lens and in independent relation to the supporting structure, said washer member and lens strap member each having a concavely curved recessed portion on the outer side thereof and a centrally disposed opening therein to be aligned with the aperture in the lens, a head portion rotatably seated in each of the recessed portions of said washer member and lens strap member, said members each having a flange formed on the outer peripheral edge of the recess therein for permanent retention of said head portions, and connection means extendable through the openings in said members and the aperture of the lens when aligned therewith to join said rotatable head portions in connected relation.

7. Connecting means for uniting the supporting structure of an ophthalmic mounting with an apertured lens comprising a lens strap assembly joined to the supporting structure and having a portion with a concavely shaped face on the side thereof to be positioned toward the lens and a second portion to be positioned in overlying relation with the opposed surface of the lens, said second portion having a concavely shaped face on the side thereof to be positioned toward the lens, and said portions with the concavely shaped faces each having a concavely shaped recessed portion on the outer side thereof and a substantially centrally disposed opening communicating with the concavely shaped faces thereof, a head portion rotatably seated in each of the recessed portions and connection means extendable through the openings in said portions and the aperture of the lens when aligned therewith to join said rotatable head portion in connected relation.

8. Connecting means for uniting the supporting structure of an ophthalmic mounting to an apertured lens comprising a pair of members each having a concavely curved recess on the outer exposed surface thereof with an opening in the lower regions thereof alignable with the aperture in said lens on its opposed sides, a pair of head portions shaped to conform to the recess of a respective recessed member and to be rotatable therein, and means projectable through the aperture of the lens and the opening in the recess of said members to join said head portions in connected relation, and convexly shaped self-aligning washer means adapted to be disposed between the lens to be supported and at least one of the recessed members.

EDWARD M. SPLAINE.

REFERENCES CITED

The following references are of record in the file of this patent:

UNITED STATES PATENTS

| Number | Name | Date |
|---|---|---|
| 858,394 | Hutton | July 2, 1907 |
| 1,001,568 | Wells | Aug. 22, 1911 |
| 1,352,918 | Rohbock | Sept. 14, 1920 |
| 1,918,993 | Wells | July 18, 1933 |
| 2,173,669 | Splaine | Sept. 19, 1939 |
| 2,332,160 | McDonell | Oct. 19, 1943 |